Aug. 25, 1959

C. E. RICKARD 2,901,269

SPLIT RING COUPLING

Filed Jan. 31, 1957

INVENTOR.
Clyde E. Rickard
BY
HIS ATTORNEYS

Aug. 25, 1959  C. E. RICKARD  2,901,269
SPLIT RING COUPLING

Filed Jan. 31, 1957  2 Sheets-Sheet 2

INVENTOR.
Clyde E. Rickard
BY Green, McCallister, & Miller
HIS ATTORNEYS

United States Patent Office 2,901,269
Patented Aug. 25, 1959

2,901,269
SPLIT RING COUPLING

Clyde E. Rickard, Pittsburgh, Pa., assignor to McDowell Manufacturing Company, Millvale, Pa., a corporation of Pennsylvania Application January 31, 1957, Serial No. 637,496

2 Claims. (Cl. 285—39)

This invention pertains to a quickly and easily detachable coupling construction that may be used for temporary as well as more permanent types of installations. One phase pertains to a self-sealing type of coupling having mechanical means for holding coupling members in position with respect to each other.

The present invention deals with the problem of providing a fool-proof type of coupling construction which, in addition to being self-sealing as to fluid flow, is positive in its retaining action as to coupled members. The latter phase of the invention is a highly important one and particularly, from the standpoint of providing an installation which may employ end portions of standard sizes and lengths of pipe or conduit members with only a slight modification or grooving of such end portions being needed for utilization.

I am dealing with a coupling that has some value in non-fluid utilizations, but is primarily useful in systems for transporting fluids or liquids, such as water, juices, petroleum products, mine slurries, etc. A coupling of this type should withstand wide variations of fluid pressure and be capable of positive utilization with minimum difficulties due to clogging materials, such as mud, etc.

It has thus been an object of my invention to devise a new and improved coupling construction that may be used in temporary as well as more permanent installations.

Another object has been to find a solution to the problem involved in providing a coupling suitable for temporary as well as more permanent installations and which may be installed and disassembled without requiring any turning of the pipe members.

A further object of my invention has been to provide a coupling construction that is adaptable to more or less conventional conduit or pipe members, which will provide a positive mechanical holding of the pipe members in a joined relationship, and which will permit the release of such members by a simple turning movement of a locking or latching means.

These and other objects of my invention will appear to those skilled in the art from the described embodiment and the appended claims.

In the drawings, Figure 1 is a longitudinal section in elevation of a coupling device constructed in accordance with my invention and as employed to hold a pair of pipe or conduit members in coupled relationship with respect to each other;

Figure 1:
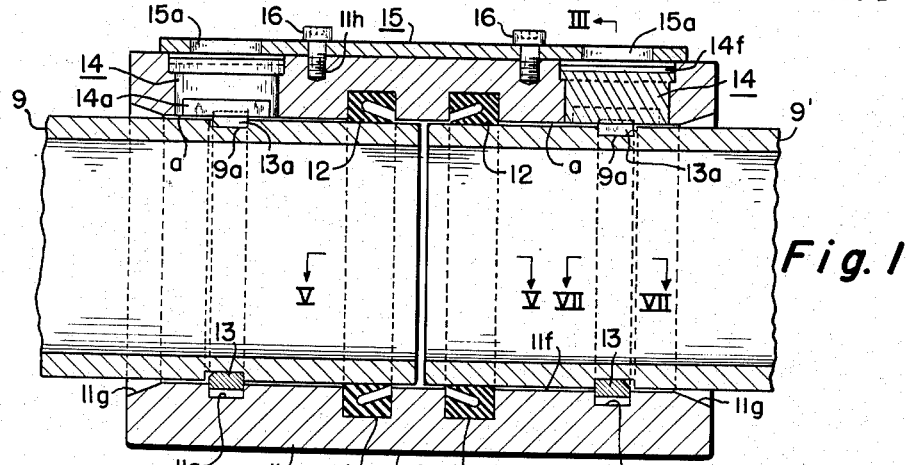
Figure 2:
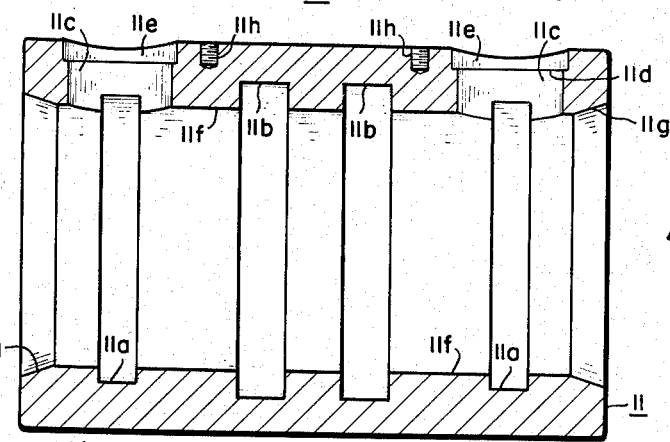
Figure 2 is a view similar to Figure 1, but only showing a section of a housing body part or member of the coupling with pipe members, working parts and accessories omitted.
Figures 3, 4:
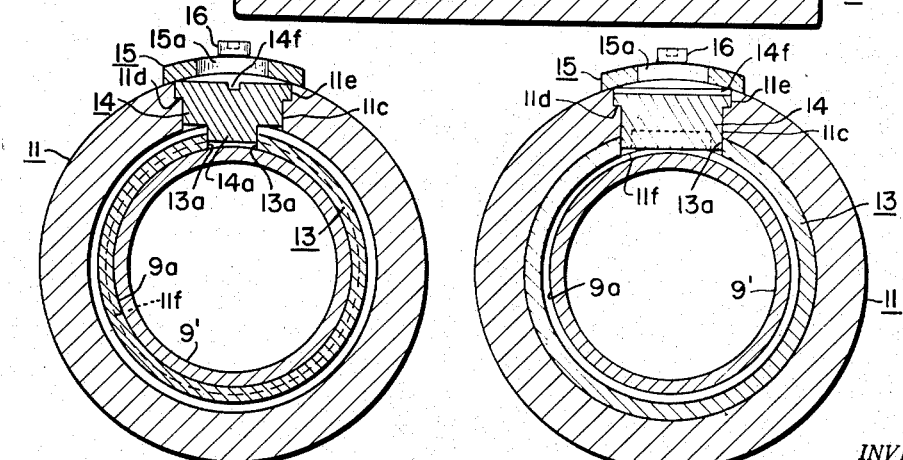
Figure 3 is an end section on the scale of and taken along line III—III of Figure 1; this figure, like Figure 1, shows a pipe or conduit member in a mechanically-held or locked relationship with respect to a coupling housing body.
Figure 4 is an end section taken along the same line as Figure 3, but showing the pipe part or member in an unlatched or released relationship.
Figure 5:
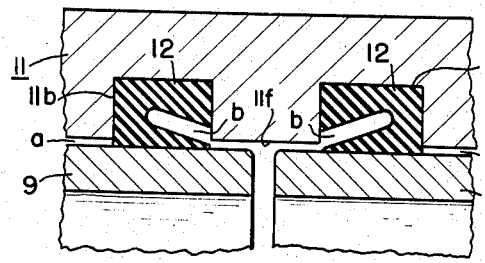
Figure 5 is a greatly enlarged fragmental section taken along the line V—V of Figure 1 and particularly showing the operative positioning and shape of gasket elements.
Figure 6:
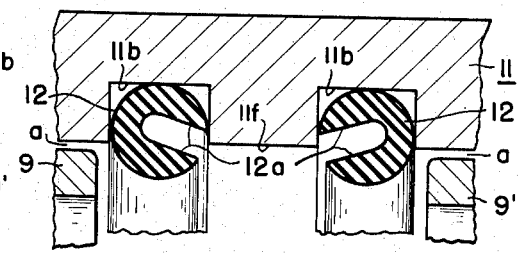
Figure 6 is a view somewhat similar to Figure 5, but showing the gasket elements and their relationship before the insertion of a nose end portion of a pipe or conduit member.
Figure 7:
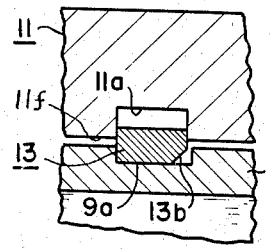
Figure 8:
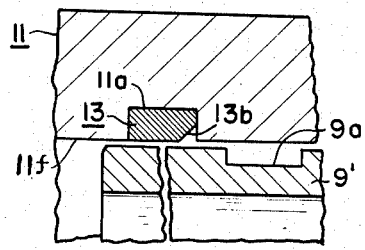
Figure 9:
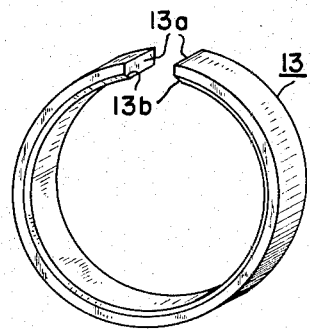
Figure 10:
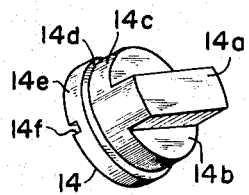
Figure 11:
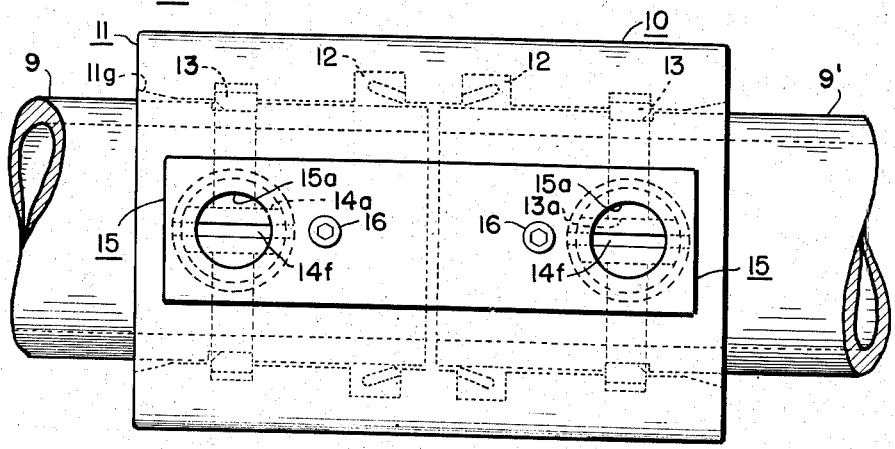

Figures 7 and 8 are greatly enlarged fragmental side sections on the scale of Figures 5 and 6, taken along the line VII—VII of Figure 1, and particularly illustrating the operative positioning of a locking means or ring element; in Figure 7, the locking means or ring element is shown in a latched, locked or inwardly-contracted position and in Figure 8 is shown in an unlatched, unlocked or outwardly-expanded position;

Figure 9 is a perspective view on the scale of Figure 1 showing the locking means or ring element, itself;

Figure 10 is a side perspective view on the same scale as Figure 1 illustrating the construction of a latch or locking control means or plug which, when turned to the position shown in Figure 4 may be employed to unlatch the locking means of Figure 9, and when turned to the position of Figure 3 will permit the latching means to hold a pipe member within the housing body; and Figure 11 is a top plan view on the scale of Figures 1 to 4, 9 and 10, showing the operative mounting of locking control means.

In carrying out my invention, I may secure a pair of adjacent or cooperating end portions of a pair of conduit or pipe members 9 and 9' by employing a coupling which has been designated as a whole as 10. This coupling utilizes a latching element or locking means 13 of a split type of resilient or spring metal ring 13, somewhat corresponding to a tempered steel piston ring used for internal combustion engines. The ring element 13 has a preformed or pre-set shape of greater diameter than its coupling seat and is resiliently-operatively carried within a grooved or radially-outwardly offset, annular seat portion 11a of a longitudinally-extending housing body part or member 11. When released (see Figures 1, 3 and 7), the ring element 13 snaps back or reduces its periphery or radial extent to lock the coupling body 11 to the pipe member 9 or 9'. A latch or locking control means, shown as an annular plug or spreading element 14, is also carried by the housing body 11 to cooperate with opposed finger ends of the latch ring or element 13 to permit them to spring-back (see Figure 3) or to spread them apart and expand the periphery or radial extent of the ring element to cause it to seat substantially fully (see Figures 4 and 8) within the groove or seat portion 11a. When the ring 13 is latched its cross sectional depth lies partially within each of a pair of cooperating latching or groove portions 9a and 11a.

An annular, chambered sealing gasket or ring 12 of resilient or rubber-like construction is carried by the housing body 11 to proportionately seal off fluid flow with respect to pipe or conduit member 9 or 9' that is to be held in position. A grooved, radially-outwardly offset, annular seat portion 11b is provided in the housing body 11 to receive the gasket 12. In Figure 1, I have shown a pair of adjacent but longitudinally spaced-apart groove and gasket assemblies 11b and 12 for sealing off pipe end portions ahead of a path of fluid flow along their joint towards groove and latch ring assemblies 9a, 11a and 13.

Since the control plugs, elements or means 14 are relatively loosely mounted for easy operation, I have also provided a positioning, retaining plate member or part 15. The plate 15 is removably secured in position on the barrel of housing body 11 by set screws 16 that cooperate with threaded bores 11h to normally hold the plugs 14 in an operating position within cross bores 11d and 11e of the housing body 11.

As shown particularly in Figures 1 to 4 inclusive, the pipe or conduit members 9 or 9' may be of any suitable material, such as metal or plastic, and for use with a coupling of my construction, only require an annular offset seat or groove 9a to be formed or cut in the outer surface thereof at a spaced location from the end of a nose portion which is to be joined or held in position. It will be noted that a coupling device 10 of my construction may be of similar operation and structure as to two halves of its housing body 11, so that each coupled pipe member 9 and 9' may be mounted and sealed off in the same manner. Of course, one half may be eliminated or may have its end wall closed, if the coupling is to serve as a dead end unit.

The housing body 11 of the coupling construction 10 (see particularly Figure 2) has a cylindrical bore 11f longitudinally therethrough of substantially uniform diameter, so as to receive nose end portions of the pipe members or conduits 9 and 9' therein with a free sliding movement. To facilitate the introduction and removal of the end portions of the members 9 and 9', the entry end portions of the housing body 11 are shown as having outwardly-beveled or diverging edge wall portions 11g. Longitudinally spaced-apart groove or inset seat portions 11a and 11b are of larger diameter than the main bore 11f and may be provided by rolling or cutting out metal on localized annular areas.

Adjacent its opposite end portions, the housing body 11 has transversely-outwardly open bores 11c—11e that are connected to the main or longitudinal bore 11f. Smaller diameter, inner, transverse bore portion 11c is connected to a larger diameter, outer, transverse bore portion 11e by a ledge portion 11d to, as shown in Figures 3, 4 and 10, rotatably loosely receive corresponding or complementary portions 14c, 14d and 14e of operating element or control plug part 14 (Figure 10).

As shown particularly in Figures 3, 4 and 11, retaining part, face or positioning plate member or segment 15 has a curvature substantially corresponding to the curvature of the outer wall or barrel of the housing body part or member 11, to rest thereupon, and to be secured thereto by suitable removable means, such as the pair of set screws 16. As shown, the plate member 15 substantially covers the control plug elements or parts 14, to abut their head portions 14f and frictionally hold them in position within the transverse bore portions of the housing body member 11.

As disclosed particularly in Figure 1, the plate members 15 have longitudinally spaced-apart, centrally-located, open sight portions 15a therein, so that a suitable means, such as a screw-driver or wrench, may be inserted therein or be accessible to fit therein to engage a grip or adjustment head portion 14f, such as a transverse slot or screw head at the outer end of the plug 14. A wrench flat, etc., may be used if desired. In this manner, each plug 14 may be turned between its locking or ring-releasing positions of Figure 3 and its pipe unlatching or ring spreading position of Figure 4, without removing the face or position plate member 15.

As shown in Figures 5 and 6, fluid sealing may be effected by resilient annular washers or gaskets 12 and particularly, ones having a ring shape with normally open mouth or ledge portions 12a. When the gasket 12 which is non-compressible is pressed (press-fit) within its seating or positioning groove or annular slot 11b (as shown in Figure 5), it will fill out the latter and provide a minimum of about ¼ of a pound per square inch of sealing pressure upon an opposed seating surface or face portion of a fluid conduit or pipe member, such as 9 or 9'. Thus, there is always a minimum fluid-sealing off action provided by the gasket 12. The sealing action is increased fluid-pressure-proportionately with an increase of fluid pressure exerted within the coupling, when fluid is introduced between the joint, as represented by adjacent edges of the nose portions of pipe members 9 and 9', and by spacing a between the outer periphery of the nose end portion of pipe member and the inner periphery of bore 11f. Since, as shown in Figure 5, the gasket 12 has a chamber b that is always open to fluid flow from between portions defining the joint, a fluid-proportioned sealing action is inherent. It will be noted that this sealing action is effected ahead or forwardly of the mechanical locking or latching action provided by ring elements or parts 13.

With particular reference to Figures 3, 4 and 9, the ring element 13 is of somewhat rectangular section, except that it may have a beveled edge 13b that is sloped towards the direction of entry of the nose end portion of the pipe member 9 or 9' that is to be held in position. This sloped or beveled edge facilitates the introduction of the pipe members into the housing body 11 when (as shown in Figures 4 and 8), the element or part 13 has been spread or moved radially-outwardly to substantially fully fill and lie within annular groove or seat portion 11a of the housing body (see Figures 3 and 8). The sloped or beveled edge 13b may also permit a nose portion to be forced into or assembled within the housing body 11 when the ring 13 is in its contracted, sprung-back or locking position. In such a case, the edge 13b operates as a wedging, outwardly-spreading means for the ring element 13 that is activated only sufficiently to permit the nose portion of the pipe member 9 or 9' to pass the ring element when the nose end portion is being inserted. However, the ring element 13 will then positively prevent a removal of the nose end portion from the coupling housing body 11 until the plug 14 is moved to the position of Figure 3.

When the ring part or element 13 is permitted to contract to its normal spring-like shape of Figure 3, it will have a somewhat intermediate position as to the spacing a between the coupling housing body or member 11 and the coupled or pipe member 9 or 9' (see Figure 7). The latching control, locking and unlocking plug means 14, as shown particularly in Figures 3, 4 and 10, has a base portion 14b provided with a downwardly or end-projecting lug, wedge or cam portion 14a that is normally positioned between opposed ends 13a of the ring part 13, so that when the plug 14 is turned, as above indicated, from a position such as shown in Figure 3, to a position such as shown in Figure 4, it will positively cam upon or wedge between the edges or ends 13a to spread the part 13 to its fully expanded relationship against its normal resiliency (see Figure 4).

The ring part or element 13 may be of stainless steel spring metal and is in the nature of a split ring that normally tends to contract to an inner diameter that is less than the diameter of the longitudinal bore 11f, as well as less than the outer diameter of nose end portions of the members to be held, such as 9 or 9'. As shown in Figure 7, the seating groove 9a, however, limits the contraction of the ring element 13, as the radial depth or section of the ring element is greater than that of the groove 9a. As a result, the ring element 13 has substantially half of its depth or section within each of the opposed seating groove portions 9a and 11a. As shown in Figure 8, the depth of grooved portion 11a is substantially equal to the depth or radial section of the ring element 13, to provide for a free removal of a pipe member when the ring 13 is in its unlatched position of Figure 4.

Besides not requiring relative turning movement to release its coupled members, the device of my invention has a further important feature as to its removal. That is, when the pipe members 9 and 9' are, for example, in the assembled position of Figure 1, and after both plugs 14 have been moved to the position of Figure 4, the housing body 11 may be slid backwardly over and to a position substantially completely on the pipe member 9, to permit the pipe members to be uncoupled without any longitudinal or axial movement of either of them. I have also found that a coupling of my construction may withstand without difficulty fluid pressures of up to 1,000 pounds per square inch. It will be noted that the gasket seating portions 11b are located somewhat centrally of the longitudinal bore 11f and forwardly of the cooperating latching portions 9a and 11a the same half of the assembly.

What I claim is:

1. A quick-release latch coupling for nose end portions of a pair of cylindrical conduit members which comprises, a longitudinally-extending tubular housing body member having a cylindrical bore longitudinally therethrough to longitudinally-slidably receive the nose end portions of the conduit members and position them in longitudinally spaced-apart axial alignment therewithin, the cylindrical bore of said housing body being of substantially uniform diameter throughout, the external diameter of the nose end portions being of the same radial external diameter as their respective conduit members, each nose end portion having an annular seating groove of rectangular cross-section recessed in its outer periphery, said cylindrical bore having a pair of longitudinally spaced-apart annular seating grooves recessed therein with each of said grooves having a rectangular cross-section which cooperates with the groove in one of the nose end portions when aligned in axially complementary and radially adjacent relationship therewith to form a latching portion between the longitudinal cylindrical bore of said housing body and the periphery of the nose end portion, a rectangular cross-sectioned resilient split-ring operatively positioned within each of the latching portions; a pair of transverse bores projecting through a wall of said housing body, each terminating in one of said annular seating grooves, and each having portions of different diameter defining a seat therein; a pair of annular control plugs, each having portions of different diameter and a seating shoulder to complement the portions of different diameter and the seat in said transverse bores, said control plugs each having a camming surface extending into one of said latching portions, each of said control plugs being operatively positioned within one of said transverse bores, the camming surface of one plug being positioned between opposed ends of one of said split rings, and the camming surface of the other plug being positioned between opposed ends of the other of said split-rings, each said split ring in a locking relation being resiliently positioned partially within both of the groves forming one latching portion, each of said annular seating grooves in said housing body members being of a depth at least equal to and the grooves in said nose end portion being less than a cross-sectional depth of one of said split rings, so that each of said camming surfaces may operatively engage the split end portions of one split ring and expand it out of position within the groove of one nose end portion and entirely into one of the grooves that are recessed in the cylindrical bore to unlock each nose end portion with respect to said housing body, each of said control plugs having a head portion provided with a transverse slot recessed therein, the head portion of each of said plugs being positioned in a recessed relation within one of said transverse bores and within the outer periphery of said housing body, a thin retaining plate removably secured to an outer wall of said housing body to loosely hold said plugs in the transverse bores of said housing body for rotation, said retainer plate having end portions overhanging said plugs and having an open sight portion axially-aligned with each of said plugs, so that a tool may be inserted therein to engage each said transverse slot and turn each said plug between its locked position and its unlocked position without removing said retaining plate.

2. A quick-release latch coupling as defined in claim 1 wherein said thin retaining plate has a curvature substantially corresponding to the curvature of the outer wall of said housing body member.

References Cited in the file of this patent

UNITED STATES PATENTS

| | | |
|---|---|---|
| 239,827 | Newman | Apr. 5, 1881 |
| 2,040,155 | Shoemaker | May 12, 1936 |
| 2,182,797 | Killon | Dec. 12, 1939 |
| 2,363,006 | Klaus | Nov. 21, 1944 |
| 2,391,100 | Mott | Dec. 18, 1945 |
| 2,479,960 | Osborn | Aug. 23, 1959 |

FOREIGN PATENTS

| | | |
|---|---|---|
| 543,733 | Great Britain | Mar. 10, 1942 |
| 73,362 | Denmark | Oct. 29, 1951 |

UNITED STATES PATENT OFFICE
CERTIFICATE OF CORRECTION

Patent No. 2,901,269                                                             August 25, 1959

Clyde E. Rickard

It is hereby certified that error appears in the printed specification of the above numbered patent requiring correction and that the said Letters Patent should read as corrected below.

Column 3, line 50, for "Figure 1" read -- Figure 11 --; column 6, line 4, for "groves" read -- grooves --; line 6, for "members" read -- member --.

Signed and sealed this 19th day of January 1960.

(SEAL)
Attest:
KARL H. AXLINE
Attesting Officer

ROBERT C. WATSON
                                                          Commissioner of Patents

UNITED STATES PATENT OFFICE
CERTIFICATE OF CORRECTION

Patent No. 2,901,269                            August 25, 1959

Clyde E. Rickard

It is hereby certified that error appears in the printed specification f the above numbered patent requiring correction and that the said Letters atent should read as corrected below.

Column 2, line 39, for "greater" read -- lesser --; line 72, strike out "set".

Signed and sealed this 12th day of July 1960.

SEAL)
ttest:

ARL H. AXLINE                                      ROBERT C. WATSON
testing Officer                                      Commissioner of Patents